(12) United States Patent
Ennals

(10) Patent No.: US 8,341,521 B2
(45) Date of Patent: Dec. 25, 2012

(54) METHOD AND APPARATUS FOR MERGED BROWSING OF NETWORK CONTENTS

(75) Inventor: Robert Ennals, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 1181 days.

(21) Appl. No.: 11/847,690

(22) Filed: Aug. 30, 2007

(65) Prior Publication Data

US 2009/0063966 A1    Mar. 5, 2009

(51) Int. Cl.
*G06F 17/00* (2006.01)
(52) U.S. Cl. ......... 715/277; 715/203; 715/234; 715/273
(58) Field of Classification Search .................. 715/200, 715/201, 203, 234, 273, 277
See application file for complete search history.

(56) References Cited

U.S. PATENT DOCUMENTS

| | | | | |
|---|---|---|---|---|
| 5,652,615 A * | 7/1997 | Bryant et al. | | 725/35 |
| 5,835,712 A * | 11/1998 | DuFresne | | 709/203 |
| 7,155,491 B1 * | 12/2006 | Schultz et al. | | 709/217 |
| 7,426,687 B1 * | 9/2008 | Schultz et al. | | 715/208 |
| 7,617,318 B2 * | 11/2009 | Shiga et al. | | 709/228 |
| 7,823,057 B1 * | 10/2010 | Schultz et al. | | 715/229 |
| 2003/0076350 A1 * | 4/2003 | Vu | | 345/738 |
| 2004/0015730 A1 * | 1/2004 | Arai et al. | | 713/201 |
| 2006/0047907 A1 * | 3/2006 | Shiga et al. | | 711/114 |
| 2006/0259938 A1 * | 11/2006 | Kinoshita et al. | | 725/118 |
| 2008/0082924 A1 * | 4/2008 | Pally | | 715/744 |
| 2009/0022474 A1 * | 1/2009 | Kubono et al. | | 386/52 |
| 2009/0055406 A1 * | 2/2009 | Kubono et al. | | 707/10 |

* cited by examiner

*Primary Examiner* — Stephen Hong
*Assistant Examiner* — Gregory J Vaughn
(74) *Attorney, Agent, or Firm* — Schwabe, Williamson & Wyatt, P.C.

(57) ABSTRACT

Client devices capable of merged browsing, and a server for assisting merged browsing, are described herein. In various embodiments, client devices may receive suggestions of network content fragments to be merge browsed with network content being browsed by the user. The client device may then receive a user selection of fragment(s) and facilitate merged browsing of the fragment(s) with the network content. In some embodiments, the client device may facilitate a user in browsing first network content and in selecting a portion of the first network content. The client device may then facilitate the user in browsing second network content and in merged browsing the selected portion with the second network content. In various embodiments, the server may accept registrations of network content fragments, receive indications from client devices of network content being browsed, and assist in merged browsing the network content with one or more network content fragments.

27 Claims, 5 Drawing Sheets

METHOD AND APPARATUS FOR MERGED BROWSING OF NETWORK CONTENTS

TECHNICAL FIELD

Embodiments relate to the fields of data processing, web applications and/or services, in particular, to methods and apparatuses for merged browsing of network contents.

BACKGROUND

With the advent of the Internet, innumerable applications and services have been developed and shared for interaction with and across the Internet. Among these applications, Internet browsers allow users to view contents of remote web servers as web pages. Such browsers often support one or more scripting and/or programming languages to handle programs provided by web servers. Further applications, such as web page editors, allow users to create their own web pages to be uploaded to servers and shared with others. In creating web pages, users can retrieve text, pictures, movies, etc. from other web pages, save the retrieved contents locally, and incorporate those contents into their web pages. Additionally, web page specification languages also support a user in specifying an address of remote web content and including that content in the web page the user is generating with the editor.

Building on the innumerable contents, applications, and services, new technologies collectively referred to as "Web 2.0" have been developed. Among these new technologies are "MashUps." A "MashUp" is a web page showing combined contents of other websites. For example, a MashUp might include a news story feed from a first website, a form from a second website, and a picture from a third website. The MashUp may be served to user browsers from a web server, just as any other web content. To-date, to create MashUps, MashUp editors have been provided and required, operating in an analogous fashion to web page editors and allowing a user to specify a MashUp and upload it to a web server for browsing by other users. Such editors have not been the easiest to use for the average users, and have hindered the adoption and spread of MashUps.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for client devices capable of merged browsing, and a server for assisting merged browsing. In various embodiments, client devices may receive suggestions of network content fragments to be merge browsed with network content being browsed by the user. The client device may then receive a user selection of fragment(s) and facilitate merged browsing of the fragment(s) with the network content. In some embodiments, the client device may facilitate a user in browsing first network content and in selecting a portion of the first network content. The client device may then facilitate the user in browsing second network content and in merged browsing the selected portion with the second network content. In various embodiments, the server may accept registrations of network content fragments, receive indications from client devices of network content being browsed, and assist in merged browsing the network content with one or more network content fragments.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "merged browse" and "merged browsing" refer to techniques for combining or appearing to combine network contents, giving the contents the appearance of being visually merged, while the user is browsing one of the network contents.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
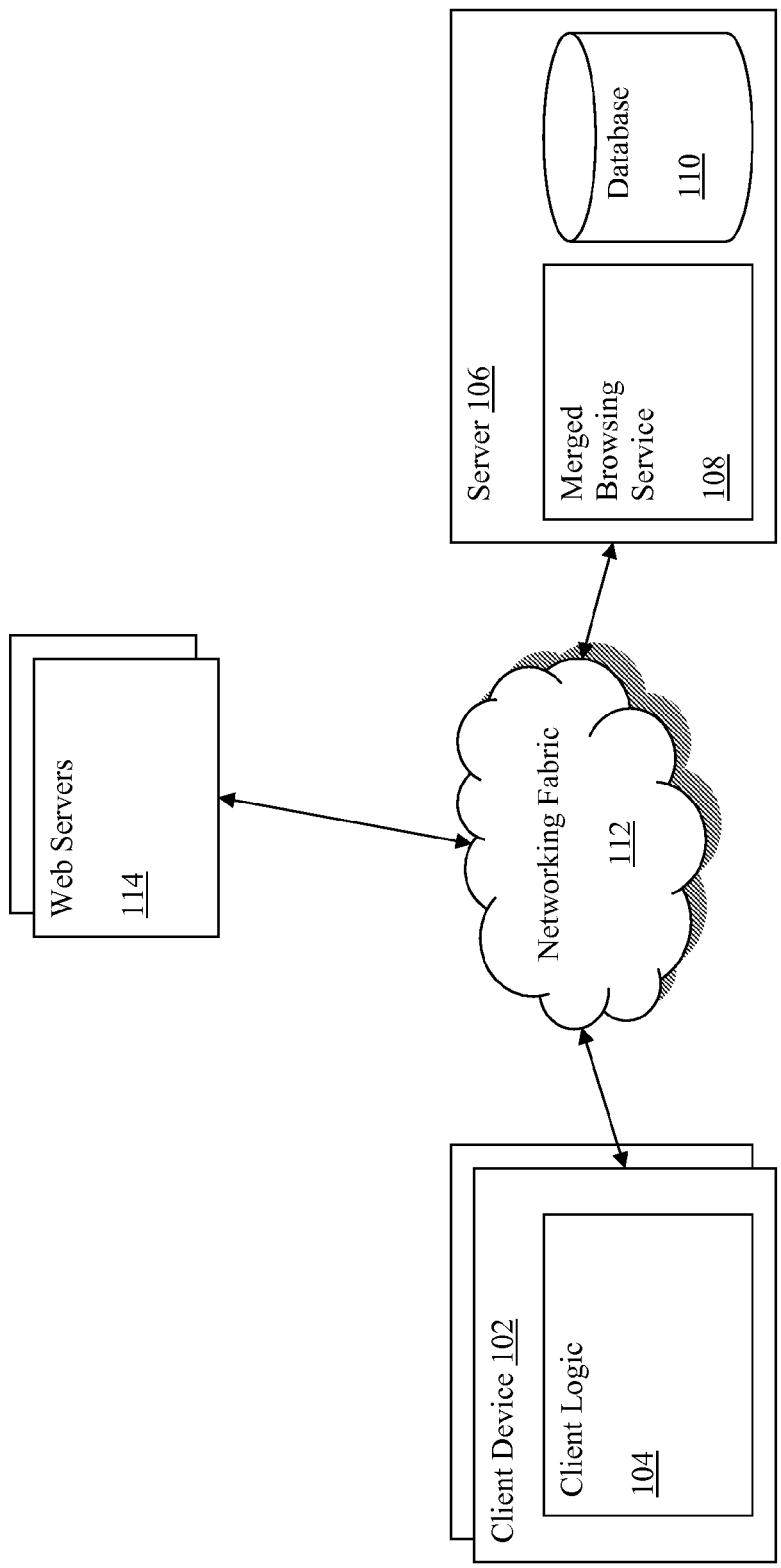
FIG. 1 illustrates an overview of various embodiments of the present invention.

FIG. 1 illustrates an overview of various embodiments of the present invention. As illustrated, client devices 102 may include client logic 104 to facilitate merged browsing of network content fragments with network content while a user of a client device 102 is browsing the network content. Client logic 104 may facilitate merged browsing in response to receiving a selection by the client device 102 user of at least one suggested network content fragment, the client logic 104 having received a list of network content fragment suggestions from a merged browsing service 108 of a server 106, and the client device 102 and server 106 being coupled via a networking fabric 112. The merged browsing service 108 may determine and provide the list in response to receiving an indicator from client logic 104 of the network content being browsed by the user of client device 102. Merged browsing service 108 may determine the list in view of associations between the received indicator and information stored in a database 110 of server 106 specifying association(s) between the content being browsed by the user and one or more network content fragments that have previously been combined with the content. The content being browsed and/or the content fragments themselves may be served to the client devices 102 and/or server 106 through networking fabric 112 by web servers 114.

Figure 5:
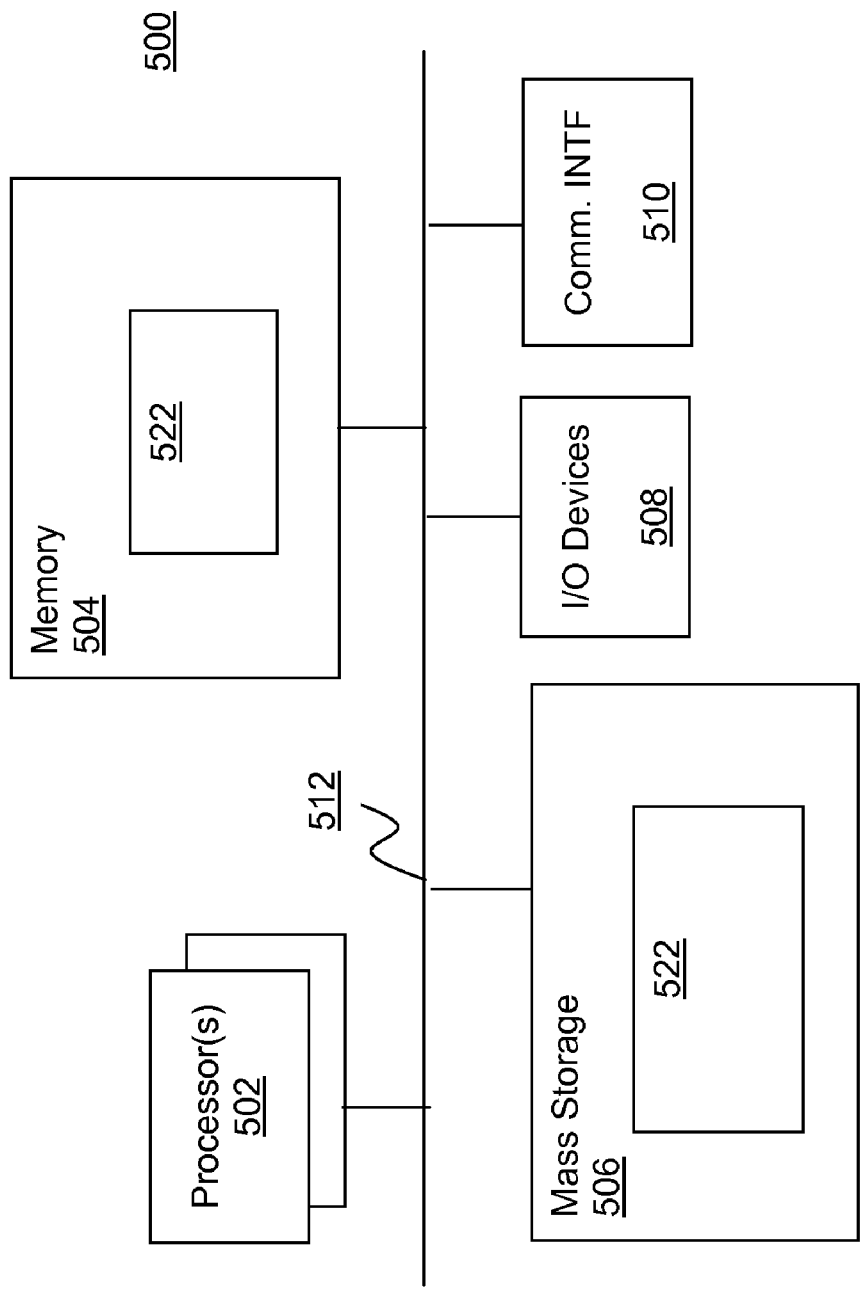
FIG. 5 illustrates an example computer system suitable for use to practice client device and/or server aspects of various embodiments of the present invention.

As illustrated, client devices 102, server 106, and web servers 114 may each be any single- or multi-processor or processor core central processing unit (CPU) computing system. Client devices 102, server 106, and web servers 114 may each be a personal computer (PC), a workstation, a server, a router, a mainframe, a modular computer within a blade server or high-density server, a personal digital assistant (PDA), an entertainment center, a set-top box, or a mobile device. Also, client devices 102, server 106, and web servers 114 may each be capable of operating a plurality of operating systems (OS) in a plurality of virtual machines (VM) using virtualization technologies. An exemplary single-/multi-processor or processor core computing system of each of client devices 102, server 106, and web servers 114 is illustrated by FIG. 5, and is described in greater detail below. Hereinafter, including in the claims, processor and processor core shall be used interchangeably, with each term including the other.

In various embodiments, as mentioned above, client devices 102 may each include client logic 104 to facilitate client device 102 users in merged browsing network content fragments with network content while the users are browsing the network content. Client logic 104 may comprise any sort of single- or multi-thread application and may be implemented as a plug-in to a client device 102 browser, such as a plug-in to a Mozilla Firefox browser, or as a separate program invocable by a user while browsing to enhance the user's browsing experience. Also, client logic 104 may include one or more user interface components, such as the visual component 404 illustrated in FIG. 4 and described below in greater detail. The user interface components of client logic 104 may provide visual representations of network content fragment suggestions to the user. In one embodiment, such suggestion representations may be selectable inputs, such as buttons, that a user can, for example, click on with a mouse to select one or more of the fragment suggestions for merged browsing. The user interface components of client logic 104 may also include a menu icon allowing the user to at least customize options of the client logic 104, as well as an icon which a user may press to select a portion of browsed network content, and another icon which a user may press to merged browse a selected portion with browsed network content.

In some embodiments, the client logic 104 is loaded and operates when the client device 102 browser is loaded and operates. In other embodiments, client logic 104 is loaded and begins operating when the user invokes logic 104 to enhance the user's browsing. Once client logic 104 begins executing, client logic 104 first determines whether the user is browsing network content and, if the client is browsing network content, the client logic determines an indicator of the network content being browsed to provide to server 106. In some embodiments, the indicator may comprise a network locator (e.g., uniform resource locator (URL)), such as the locator of the exact content being browsed (e.g., www.name.com/page1.html) or a reduced form of the locator (e.g., a host name). In other embodiments, the indicator may comprise one or more other descriptors of the browsed network content, such as a page title found in metadata of the browsed network content, headers found in the browsed network content, and/or one or more other descriptors of the content. Upon determining the indicator, the client logic 104 may provide the indicator to server 106 to indicate to server 106 the network content being browsed by the client device 102 user. In some embodiments, each time the user browses to new network content, such as a new web page, client logic 104 determine a new indicator and provides the new indicator to server 106. In other embodiments, client logic 104 only provides a new locator when the user browses to network content associated with a different host name.

In various embodiments, after providing client logic 104 with the above-described indicator, client logic 104 may receive a list of one or more suggestions of network content fragments and/or categories of fragments for combining with the browsed network content. The process by which server 106 determines the list is described below in detail. In one embodiment, the suggested network content fragments may be one or more of text, pictures, audio files, video files, audio-visual files, form elements, or programs selected from one or more pages of network content. These fragments may be visually merged with the browsed network content for merged browsing. For example, if the browsed network content is a web page listing various types of commercial aircraft, the suggested network content fragment might be a short textual description, taken from another web page, of the leg room on one or more of the aircraft. The suggestions may also include categories of fragments to combine with the network content being browsed. For example, if the browsed network content is a web page with a plurality of apartment listings, the suggested category of fragments may be an address category, and address fragments may be added to apartment listings for which fragments are available. In one embodiment, the suggestions provided in the list may be enhanced with network content fragments specified by the user of the client device 102 while browsing previous network content, or with a user-selected portion of previously browsed network content. User-specifying and selecting are described below in greater detail. The client logic may then present the suggestions to the user through, for example, the above-described visual descriptions to facilitate the user in selecting at least one of the network content fragments to be visually merged with the network content for merged browsing.

In some embodiments, the list of suggestions received by client logic 104 may comprise a complex set of data and rules for extracting relevant data by client logic 104. For example, if client logic 104 provided a host name as the indicator, client logic 104 may receive in return a set of conditional statements comprising patterns for client logic 104 to match browsed network content against. For example, each pattern may specify a page or family of pages of the host to which the browsed network content belongs. Client logic 104 may then match one or more of the patterns. For the matched patterns, client logic 104 may retrieve extractors, argument handlers, and suggested network content fragments associated with the pattern. The network content fragments retrieved from the data based on these rules may comprise at least some of the network content fragments suggested to the user. The retrieved extractors may be regular expressions used to retrieve information, such as a structural description or specification, from the browsed network content and from any of the network content fragments that may be selected for merged browsing. The retrieved argument handlers may also be regular expressions and may specify arguments for the browsed network content and/or network content fragments for merged browsing.

In some embodiments, client logic 104 may then receive a selection by the user of at least one network content fragment that was suggested to the user. Client logic 104 may receive the selection through, for example, an activation by the user of one of the above-described visual representation(s) associated with the at least one network content fragment. In response to receiving the user's selection, client logic 104 may facilitate merged browsing of the selected fragment(s) with the browsed network content. In various embodiments, facilitating merged browsing may include the client logic 104 either combining structural descriptions/specifications associated with the selected fragment(s) and browsed network content to create merged content for merged browsing or receiving merged content from server 106 for merged browsing.

In some embodiments, as mentioned above, the list of suggested fragment(s) may include extractors and argument handlers for the suggested fragment(s) specifying how to retrieve structural descriptions/specifications for the browsed network content and suggested network content fragments. In such embodiments, when the user selects the at least one network content fragment, the client logic 104 may use the extractors for the at least one network content fragment and the browsed network content to retrieve a specification, such as Hypertext Markup Language (HTML) source code, from, for example, a web page serving network content that includes the selected fragment(s). The client logic 104 may determine where within the browsed network content to add the specification of the fragment. In one embodiment, client logic 104 may compare values of the specifications to determine similarities and may add the specification of the selected fragment(s) to the specification of the browsed network content at one or more locations within the specification of the browsed network content where similarities were determined to exist. The combined specification thus specifies merged content to be displayed to the user for merged browsing.

In another embodiment, client logic 104 may use the extractors for the at least one network content fragment and the browsed network content to retrieve or create structural descriptions for the at least one network content fragment and the browsed network content, such as object trees. In such embodiments, values of nodes of the trees are compared to determine similarities, and the node(s) of the selected fragment(s) may be overlaid at a position within the tree of the browsed network content where a similarity was determined to exist. The resulting tree then specifies a structural description of the merged content to be displayed to the user for merged browsing.

In other embodiments, upon receiving the user's selection(s) of network content fragment(s), client logic 104 provides an indication of the fragment(s) selected, the indication including, for example, a portion of the information about the fragment(s) provided to the client logic 104 in the list. In return, client logic 104 may receive merged content for displaying to the user for merged browsing In one embodiment, while the user is merged browsing the merged content, client logic 104 may provide server 106 with an indicator of the merged content, such as the indicator described above, and may receive, in return, an additional list of additional network content fragments to suggest to the user to facilitate the user in selecting at least one of the network content fragments to be visually merged with the network content for merged browsing.

In various embodiments, in addition to suggesting network fragments to combine and facilitating their merged browsing with the browsed network content, client logic 104 may facilitate a user in selecting a portion of first browsed network content and in merged browsing the selected portion with second browsed network content. As mentioned above, client logic 104 may provide visual representations of icons to facilitate these operations, such as the "copy" and "paste" icons shown below in FIG. 4. For example, to select a portion of first browsed network content, the user may in some manner highlight or interact with a portion of the first browsed network content, and then activate an icon associated with selecting portions of browsed network content. In one embodiment, the selecting operation of client logic 104 selects a portion of a specification associated with the portion for use in combining with other network contents. The user may then browse to second network content and may activate an icon associated with merged browsing the selected portion. In some embodiments, the merged browsing may be effected by operations such as those described above for combining specifications/overlaying nodes associated with the selected portion and the browsed second network content. In some embodiments, upon merged browsing of the second network content with the selected portion, client logic 104 may provide an indicator to server 106, such as that described above, of the user's merged browsing of merged content including the selected portion and second network content. In response, the client logic may receive a list of suggestions of network fragments for combining with the merged content, the list based at least partially on each of the selected portion and the second network content. The client logic 104 may then provide the suggestions to the user. Additionally, these portion selecting and merged browsing operations may be practiced simultaneously with the above described operation of suggesting network fragments to combine and facilitating their merged browsing with the browsed network content.

In some embodiments, client logic 104 may further facilitate a user in registering a network content fragment with server 106. For example, a user having browsed a first page with useful information may then browse a second page to which the user would like the information to be added. If the useful information is not suggested as a network content fragment which may be merged browsed with the second page, the user may use client logic 104 to specify a registration of the network content fragment for the useful information and provide the registration to the server 106. The user may then use the above portion selection and merged browsing operations of client logic 104, and upon subsequent browsing of the second page may receive the user-specified network content fragment as a suggestion. In one embodiment, client logic 104 may facilitate forming of a registration by providing the user with an editor window in which the user can specify the registration. The registrations specified by the user may include, in some embodiments, information identifying the fragment such as a URL, information specifying the fragment, such as its HTML source code, and/or one or more descriptors for handling the fragment, such as an extractor or an argument handler.

Figure 4:
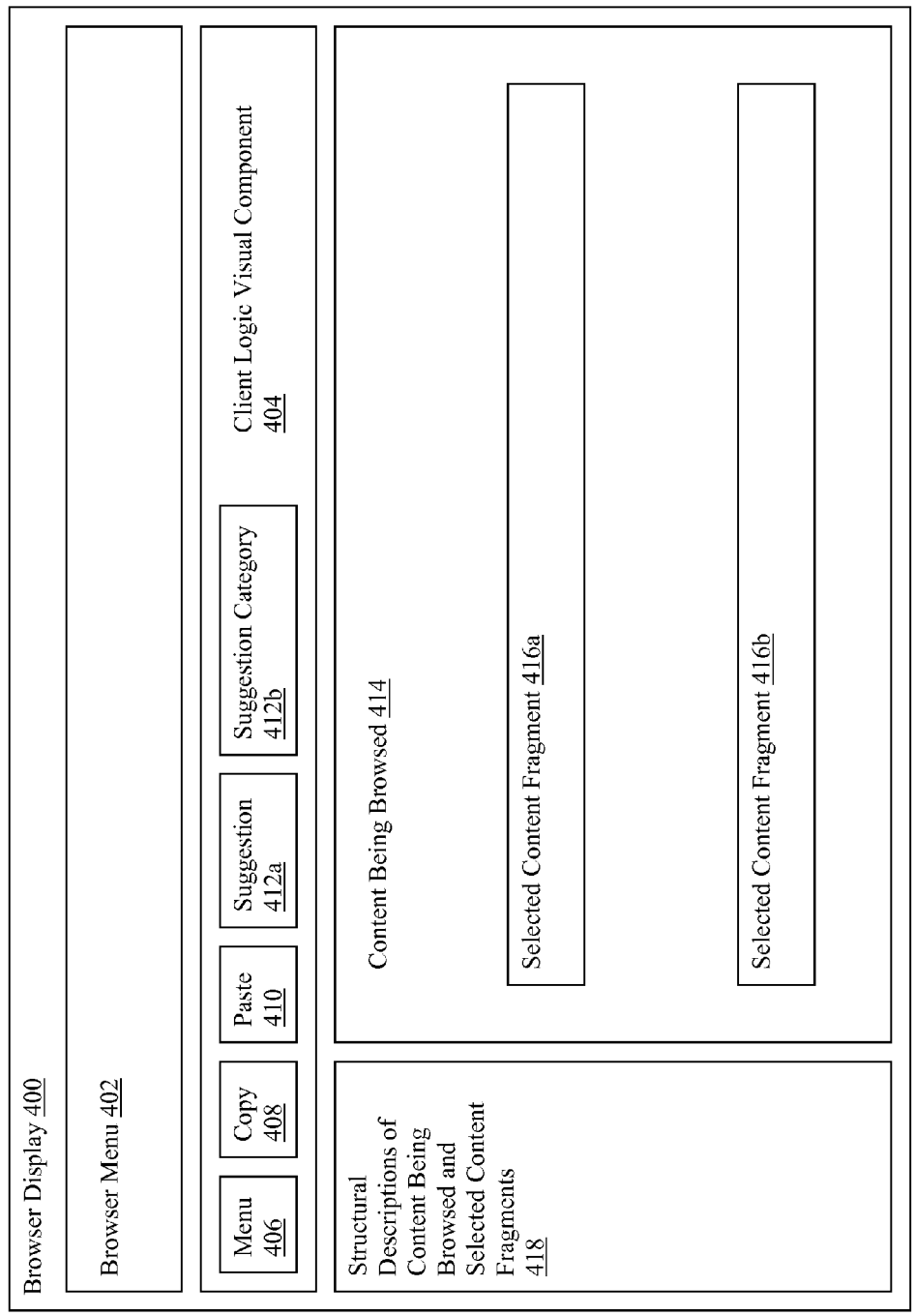
FIG. 4 illustrates an exemplary display of an enhanced client browser in accordance with various embodiments of the invention.

In one embodiment, in addition to displaying merged content to the user through merged browsing, client logic 104 may display the above-mentioned structural descriptions of the network content being browsed and the selected network content fragment in a window to a side of the merged browsed contents, as is illustrated in FIG. 4 and described below. The structural descriptions may display portions of both the browsed network contents and selected fragments as nodes of a tree structure. Determining of such structural descriptions is described above. Client logic 104 may display the structural descriptions to facilitate a more advanced client in altering bindings of the selected fragment(s) to the browsed network content to, for example, place the selected fragment in a different location with the browsed network content.

As illustrated and described above, server 106 may include merged browsing service 108 and database 110 to receive and store user registrations of network content fragments, to receive user indications of network content being browsed, and to assist the user in merged browsing of one or more network content fragments with the network content being browsed by the user. Merged browsing service 108 may be any single- or multi-threaded service application and may be capable of simultaneously serving multiple client devices 102.

In various embodiments, merged browsing service 108 may accept registrations of network content fragments from client devices, the registrations specified by users of the devices 102. Upon accepting the registrations, the merged browsing service 108 may store the registrations in database 110 for use in assisting merged browsing. As mentioned above, in one embodiment, the registrations may include one or more extractors, argument handlers, or other information describing the user-specified network content fragment(s) being registered. Also, the registration may specify a type or family of network contents. And in some embodiments, merged browsing service 108 may provide an interface allowing users to edit the registrations over the networking fabric 112. Thus, a registration may be specified by one user and edited by other user(s). In one embodiment, once a registration has been judged to be of high quality, it may be "locked down", preventing potential vandalism or improper edits by inexperienced users.

In some embodiments, merged browsing service 108 may further be capable of receiving indicators of network content being browsed by users of client device 102, as described above. The merged browsing service 108 may then determine based on information included in the indicator one or more extractors or argument handlers for the browsed network content based on the URL and/or host name mentioned in the indicator.

In response to receiving an indicator, merged browsing service 108 may assist the client device providing the indicator in facilitating merged browsing of the network content with one or more network content fragments and/or categories of network content fragments, including the user-specified network content fragment(s), based at least on association(s) between (A) the indicated network content or a category including the indicated network content and (B) the one or more network content fragments and/or categories of network content fragments.

In one embodiment, merged browsing service 108 may assist merged browsing by determining and providing a list of suggested network content fragments to the user of the client device 102 providing the indicator, such as the data and rules for extracting from the data described above. In some embodiments, the merged browsing service 108 may first lookup extractors and argument handlers associated with the URL or host name mentioned in the indicator. Merged browsing service 108 may then determine combinations of network content fragments and browsed network contents associated with the extractors and argument handlers. In one embodiment, if too many combinations are found, the merged browsing service 108 may also determine how often each fragment has previously been merged browsed with the indicated browsed content and may select the combinations having the highest frequency. Upon determining the list, merged browsing service 108 may provide the list to the client device 102 that provided the indicator to assist in merged browsing.

In one embodiment, merged browsing service 108 may further receive an indication from the user of the client device 102 of at least one network content fragment selected by the user for merged browsing. Merged browsing service 108 may then retrieve the specifications/structural descriptions, using, for example, extractors and argument handlers stored in database 110, and combine the specifications or overlay the nodes, as described above. The resulting merged content may then be provided to the client device 102 by merged browsing service 108 to assist merged browsing.

In various embodiments, in response to merged browsing by the user, merged browsing service 108 may determine and provide a further list of suggested network content fragments, and may update database 110 to reflect the merged browsing.

As is shown, server 106 may include database 110, and database 110 may be any sort of database known in the art, except for its internal structuring (e.g., tables) and data. Database 110 may be a relational database, a normalized database, a de-normalized database, or a file. In various embodiments, database 110 may store registrations for network content, network content fragments, and/or categories of either, the registrations including, e.g. extractors, argument handlers, locators, and other information for network content, network content fragments, and categories. Database 110 may also store combinations of fragments/fragment categories and network content/content categories that have been merged browsed and a counter for each combination to determine the combination's popularity. In one embodiment, database 110 may also store location information and/or other contextual information associated with a combination.

As is further shown, client devices 102, server 106, and web servers 114 may be connected by a networking fabric 112. The networking fabric 112 connecting the computing systems may be any sort of networking fabric known in the art, such as one or more of a local area network (LAN), a wide area network (WAN), and the Internet. In various embodiments, the networking fabric may comprise a private LAN or WAN of an enterprise. The parties to the connection, here client devices 102, server 106, and web servers 114, may further use any communication protocol known in the art, such as the Hypertext Transfer Protocol (HTTP), and any transport protocol known in the art, such as the Transmission Control Protocol/Internet Protocol (TCP/IP) suite of protocols. As mentioned, each of client devices 102, server 106, and web servers 114 may have a networking interface to facilitate networked communication across networking fabric 112.

Figure 2:
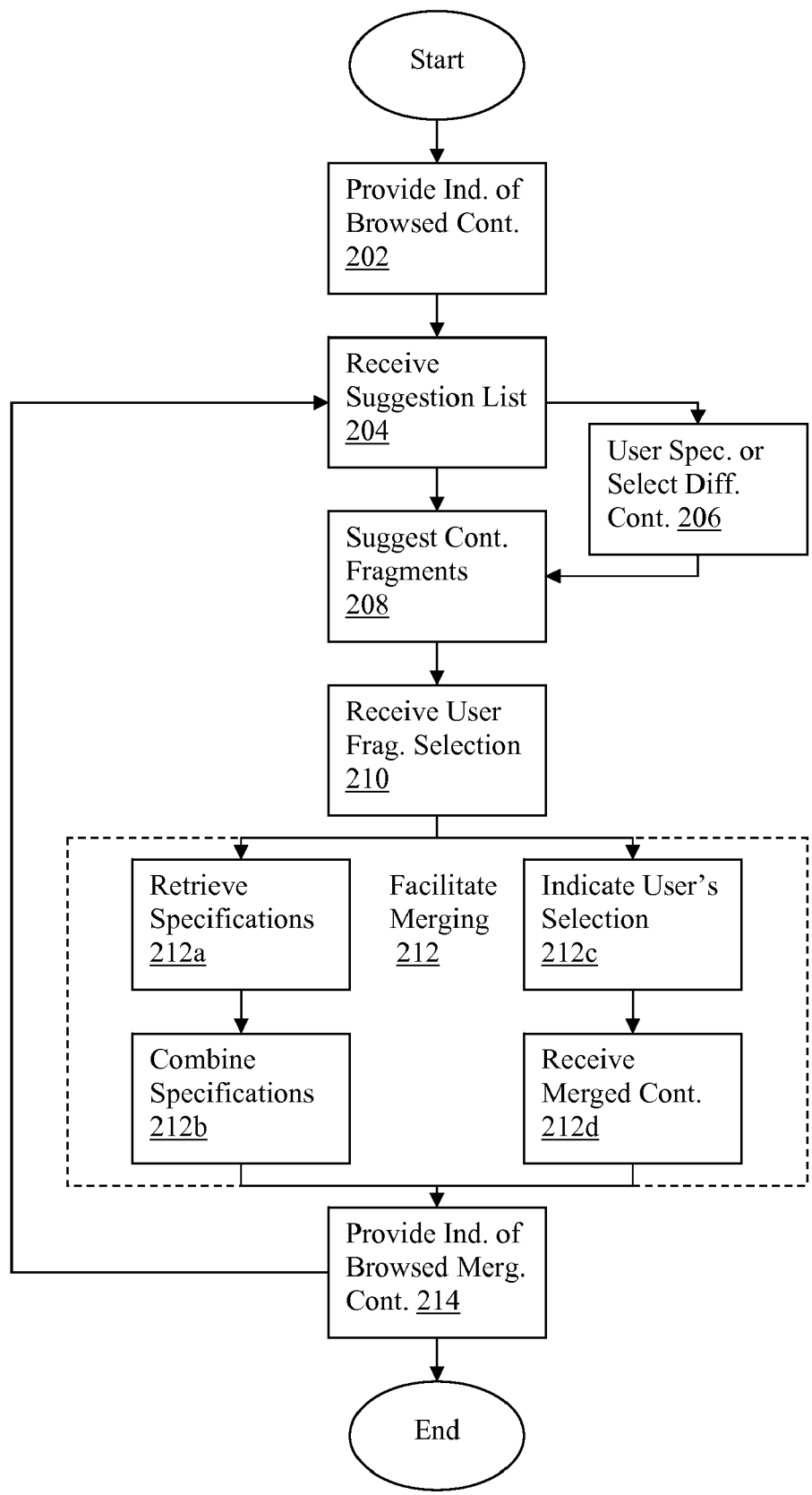
FIG. 2 illustrates a flow chart view of selected client device operations of the methods of various embodiments of the present invention.

FIG. 2 illustrates a flow chart view of selected client device operations of the methods of various embodiments of the present invention. As illustrated, the client device may provide to a server an indicator of network content being browsed by the client device, block 202. In one embodiment, at least one of the network content fragments is one or more of text, pictures, audio files, video files, audio-visual files, form elements, or programs selected from one or more pages of network content. In response to the providing, the client device may receive from the server a list of network content fragments and/or categories of network content fragments, at least a portion of the entries of the received list to be suggested network content fragments, block 204. In one embodiment, the list of network content fragments may comprise data and rules for processing the data, the data including extractors and/or argument handlers for each network content fragment of the list. Also, in some embodiments, the client device may facilitate the user in selecting or specifying a specification of at least a portion of different network content having been previously browsed, block 206. In one embodiment, the portion may be suggested as one of the network content fragments and the specification may be used in merged browsing the portion with network content being browsed.

As is further shown, the client device may then suggest to a user network content fragments for adding to the network content being browsed by the user using the client device to facilitate the user in selecting at least one of the network content fragments to be visually merged with the network content for merged browsing, block 208. The suggesting may include rendering to the user display representations of the network content fragments. In one embodiment, at least a portion of the suggested network content fragments are suggested to the user as a category including multiple network content fragments to facilitate the user in selecting the multiple network content fragments as the at least one of the network content fragments. Next, the client device may receive a user selection to merge all or a subset of the suggested network content fragments with the network content being browsed, block 210.

In various embodiments, in response to receiving the user selection, the client device may facilitate merging of the selected network content fragment(s) with the network content being browsed for merged browsing of the merged content, block 212. In some embodiments, the facilitating merging may include retrieving a specification/structural description of the at least one of the network content fragments and a specification/structural description of the network content being browsed, and the retrieving is based on one or both of an extractor and/or an argument handler for the at least one of the network content fragments, block 212a. The client device may then combine the specifications/structural descriptions to produce a combined specification/structural description, the combined specification/structural description specifying the merged content for merged browsing, block 212b. In other embodiments, the facilitating merging may include indicating to a server the user's selection of the at least one of the network content fragments, block 212c, and receiving the merged content from the server for merged browsing, block 212d.

As is further illustrated, the client device may then provide to the server an indicator of the merged content being merged browsed, block 214, and receive, in response, a list of network content fragments and/or categories of network content fragments for suggesting to the user, block 204.

Figure 3:
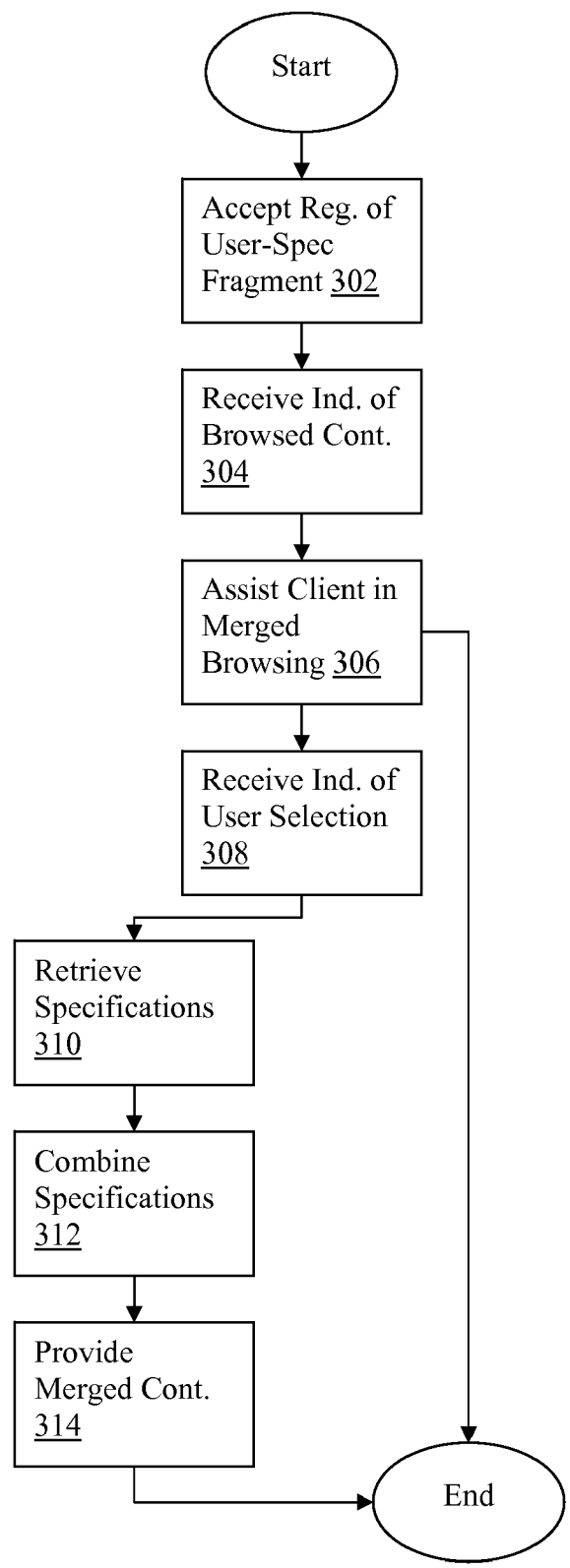
FIG. 3 illustrates a flow chart view of selected server operations of the methods of various embodiments of the present invention.

FIG. 3 illustrates a flow chart view of selected server operations of the methods of various embodiments of the present invention. As illustrated, a server may accept registration of one or more user-specified network content fragments from a first client device, the registration including one or more of an extractor, an argument handler, or other information describing the user-specified network content fragment(s), block 302. In one embodiment, the registration may specify a registration of a type or family of network contents.

In various embodiments, the server may then further receive, from a second client device, an indicator of network content being browsed by the second client device, block 304. In response, the server may assist the second client device in facilitating merged browsing of the network content with one or more network content fragments and/or categories of network content fragments, including the user-specified network content fragment(s), based at least on association(s) between (A) the indicated network content or a category including the indicated network content and (B) the one or more network content fragments and/or categories of network content fragments, block 306. In one embodiment, the assisting may further include determining a list of the one or more network content fragments and/or categories of network content fragments to provide to the user.

In various embodiments, the association(s) may include information specifying that users have previously combined the one or more network content fragments and/or categories of network content fragments with the indicated network content or category of the indicated network content. Such information may be stored in a database of the server, along with, in one embodiment, other information specifying combinations of network content fragments and/or categories of network content fragments with network contents or categories of network contents, as well as a count for each combination tracking how often that combination is selected by users. In some embodiments, the stored information may comprise registrations for each of the network content fragments, categories of network content fragments, network contents, and categories of network contents, the registrations including at least one of an extractor, an argument handler, or other information.

As is further shown, the server may then receive an indication from the second client device of the user's selection of the at least one of the one or more network content fragments and/or the categories of network content fragments, block 308. In response, in some embodiments, the server may retrieve specifications/structural descriptions for the indicated network content and the selected network content fragment(s), block 310, combine the retrieved specifications/structural descriptions to create merged content, block 312, and provide the merged content to the client device for merged browsing, block 314.

FIG. 4 illustrates an exemplary display of an enhanced client browser in accordance with various embodiments of the invention. As illustrated, a browser display window 400 may include a browser menu component 402 and other menu components known in the art, such as a Google® Toolbar. Browser display 400 may also be enhanced with a client logic visual component 404, appearing as a menu bar, and visual component 404 may facilitate at least a portion of the client logic 104 operations described above.

As shown, visual component 404 may also include a number of icons, such as a menu icon 406, a "Copy" icon 408, a "Paste" icon 410, and suggestion/suggestion category buttons 412a/412b. Copy icon 408 and paste icon 410 may facilitate a user in selecting a portion of network content and merged browsing a selected portion with network content, respectively, as is described in greater detail above with regard to client logic 104. Suggestion/suggestion category buttons 412a/412b may render to a user display representations of suggestions of network content fragments for combining with network contents being browsed by the user, as is described in greater detail above with regard to client logic 104.

In a region of the browser display 400 which typically shows network content being browsed 414, the user may merged browse content 414 and one or more selected network content fragments 416, the content 414 and fragment(s) 416 appearing visually merged, as is described in greater detail above with regard to client logic 104. For example, content 414 may be a listing of apartments for rent, and suggested category button 412b may suggest a "restaurant" category of network content fragments 416, the fragments 416 including textual description of restaurant names, phone numbers and addresses. If the user selects the "restaurant" button 412b, the apartment listings 414 may be merged browsed with the restaurant textual fragments 416 in the fashion illustrated in FIG. 4. For example, each individual one of the apartment listings may be followed by a one of the restaurant fragments describing a restaurant near that apartment.

As is further shown, to a side of the region having content 414 and fragment(s) 416, the browser display 400 may optionally include structural descriptions of content 414 and fragment(s) 416 to facilitate advanced users in viewing the underlying structure of the content 414 and fragment(s) 416, and to facilitate the advanced user in modifying specifications of the content 414/fragment(s) 416 or altering a binding of a fragment 416 to content 414 to effect a different visual merging of the fragment 416 and content 414, as is described above in greater detail with regard to client logic 104.

FIG. 5 illustrates an example computer system suitable for use to practice client device and/or server aspects of various embodiments of the present invention. As shown, computing system 500 includes a number of processors or processor cores 502, and system memory 504. For the purpose of this application, including the claims, the terms "processor" and "processor cores" may be considered synonymous, unless the context clearly requires otherwise. Additionally, computing system 500 includes mass storage devices 506 (such as diskette, hard drive, compact disc read only memory (CDROM) and so forth), input/output devices 508 (such as display, keyboard, cursor control and so forth) and communication interfaces 510 (such as network interface cards, modems and so forth). The elements are coupled to each other via system bus 512, which represents one or more buses. In the case of multiple buses, they are bridged by one or more bus bridges (not shown).

Each of these elements performs its conventional functions known in the art. In particular, system memory 504 and mass storage 506 may be employed to store a working copy and a permanent copy of the programming instructions implementing the various components, such as client logic 104 or merged browsing service 108, herein collectively denoted as 522. The various components may be implemented by assembler instructions supported by processor(s) 502 or high-level languages, such as, for example, C, that can be compiled into such instructions.

The permanent copy of the programming instructions may be placed into permanent storage 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent and program various computing devices.

The constitution of these elements 502-512 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method, comprising:
visually suggesting, by a client device on a display of the client device, network content fragments to add to network content being browsed using the client device to facilitate selection of at least one of the visually suggested network content fragments to be visually merged with the network content being browsed;
receiving, by the client device, the selection to merge the at least one of the visually suggested network content fragments with the network content being browsed; and
in response to said receiving the selection, facilitating, by the client device, a merger of the selected at least one of the network content fragments with the network content being browsed as merged content presented at the display of the client device,
wherein said facilitating the merger includes combining, by the client device, a specification/structural description of the selected at least one of the network content fragments with a specification/structural description of the network content being browsed to produce a combined specification/structural description, the combined specification/structural description specifying the merged content, and
wherein said combining includes:
comparing values of the specification/structural description of the selected at least one of the network content fragments with values of the specification/structural description of the network content being browsed to determine similarities; and
adding the specification/structural description of the selected at least one of the network content fragments to the specification/structural description of the network content being browsed, at one or more locations within the specification/structural description of the network content being browsed where similarities are determined to exist.

2. The method of claim 1, wherein at least a portion of the suggested network content fragments is visually suggested as a category including multiple network content fragments to facilitate selection of the multiple network content fragments as the at least one of the network content fragments.

3. The method of claim 1, wherein said visually suggesting includes rendering, on the display of the client device, representations of the network content fragments.

4. The method of claim 1, further comprising receiving from a server, by the client device, a list of network content fragments and/or categories of network content fragments, at least a portion of the suggested network content fragments corresponding to entries of the received list.

5. The method of claim 4, wherein the list of network content fragments includes data and rules to process the data, the data including extractors and/or argument handlers for each network content fragment of the list.

6. The method of claim 1, further comprising retrieving, by the client device, the specifications/structural descriptions of the selected at least one of the network content fragments and of the network content being browsed, and wherein said retrieving is based on one or both of an extractor and/or an argument handler for the selected at least one of the network content fragments.

7. The method of claim 6, further comprising, prior to said visually suggesting, facilitating, by the client device, selection or identification of a specification of at least a portion of different network content being browsed.

8. The method of claim 1, wherein said facilitating the merger includes:
indicating to a server the selection of the at least one of the network content fragments; and
receiving the merged content from the server to be presented at the display of the client device.

9. The method of claim 1, further comprising:
providing to a server, by the client device, an indicator of the merged content presented at the display of the client device; and
receiving, by the client device, a list of network content fragments and/or categories of network content fragments to further visually suggest on the display of the client device.

10. The method of claim 1, wherein the selected at least one of the network content fragments includes one or more of text, pictures, audio files, video files, audio-visual files, form elements, or programs selected from one or more pages of network content.

11. A server, comprising:
    a processor; and
    a merged browsing service to be operated by the processor and configured to:
        accept registration of one or more network content fragments from at least a first client device, the registration including an extractor expression to retrieve information from network content being browsed and from the one or more network content fragments, and an argument handler expression to specify arguments for the network content being browsed or for network content fragments to support merged browsing,
        receive, from the at least the first client device, an indicator of network content being browsed on a display of the at least first client device, wherein the one or more network content fragments are visually suggested on the display of the at least the first client device to facilitate selection of at least one of the visually suggested network content fragments to be visually merged with the network content being browsed, and
        in response to the received indicator, assist the at least the first client device to facilitate a merger of the network content being browsed with the selected at least one of the network content fragments and/or with categories of network content fragments as merged content presented on the display, said merger based at least on an association between:
            (A) the indicated network content being browsed or a of the network content being browsed; and
            (B) the selected at least one of the network content fragments and/or categories of network content fragments.

12. The server of claim 11, wherein to said assist, the merged browsing service is further configured to determine a list of the one or more network content fragments and/or categories of network content fragments to be visually suggested on the display.

13. The server of claim 11, wherein the association includes information to indicate that the one or more network content fragments and/or categories of network content fragments have been previously merged with the network content or the category of the network content.

14. The server of claim 11, further comprising a database, coupled to the merged browsing service, to store information to specify combinations of network content fragments and/or categories of network content fragments with network contents or categories of network contents, as well as a count for each combination to track how often that combination is selected for merger, and the merged browsing service is further configured to draw the association from the information stored in the database.

15. The server of claim 14, wherein the stored information to specify the combinations includes registrations for each of the network content fragments, categories of network content fragments, network contents, and categories of network contents, the registrations including at least one of an extractor, an argument handler, or other information.

16. The server of claim 14, wherein the one or more network content fragments and/or categories of network content fragments include network content fragments and/or categories of network content fragments whose combinations with the network content being browsed or with the category of the network content have highest counts.

17. The server of claim 11, wherein the merged browsing service is further configured to:
    receive an indication from the at least the first client device of the selection of the at least one of the suggested network content fragments and/or a selection of the categories of network content fragments; and
    in response to the received indication, retrieve specifications and/or structural descriptions for the network content being browsed and the selected at least one of the network content fragments, combine the retrieved specifications/structural descriptions to create the merged content, and provide the merged content to the at least the first client device to be presented on the display.

18. The server of claim 17, wherein to said combine the retrieved specifications/structural descriptions to create the merged content, the merged browsing service is configured to:
    compare values of the specification/structural description of the selected at least one of the network content fragments with values of the specification/structural description of the network content being browsed to determine similarities; and
    add the specification/structural description of the selected at least one of the network content fragments to the specification/structural description of the network content being browsed, at one or more locations within the specification/structural description of the network content being browsed where similarities are determined to exist.

19. The server of claim 11, wherein the at least the first client device includes:
    a first client device to provide said registration to the merged browsing service; and
    a second client device to provide the indicator of the network content being browsed to the merged browsing service.

20. An article of manufacture, comprising:
    a non-transitory storage medium; and
    a plurality of programming instructions stored on the storage medium and configured to program a client device to enable the client device to:
        first facilitate a user in separately browsing first and second network content visually presented on a display of the client device,
        second facilitate the user in selection of at least a portion of the visually presented first network content,
        merge the selected portion of the visually presented first network content with the second network content as merged content visually presented on the display of the client device, wherein said merge includes combine a specification/structural description of the selected portion of the first network content with a specification/structural description of the second network content to produce a combined specification/structural description, the combined specification/structural description specifying the merged content, and
        visually suggest to the user one or more additional network content fragments to merge with the merged content having the selected portion of the first network content and the second network content, based at least in part on the selected portion of the first network content that is merged with the second network content.

21. The article of claim 20, the programming instructions to program the client device to enable the client device to said second facilitate include programming instructions to facilitate selection of a specification of the portion of the visually presented first network content.

22. The article of claim 20, wherein the programming instructions are further configured to program the client device to enable the client device to provide a visual component on the display, the visual component including at least one icon to said facilitate said selection and/or said merge.

23. The article of claim 20, wherein the programming instructions are further configured to program the client device to enable the client device to, in response to said merge, provide a server with an indicator of the merged content to facilitate the server in storage of a relation between the selected portion and the second network content.

24. The article of claim 20, wherein
wherein said instructions to combine include instructions configured to program the client device to enable the client device to:
compare values of the specification/structural description of the selected first network content with values of the specification/structural description of the second network content to determine similarities; and
add the specification/structural description of the selected first network content to the specification/structural description of the second network content, at one or more locations within the specification/structural description of the second network content where similarities are determined to exist.

25. An apparatus, comprising:
a client device that includes:
a processor;
a storage device coupled to the processor and configured to store client logic; and
the client logic, to be operated by the processor, and configured to:
visually suggest, on a display of the client device, network content fragments to add to network content being browsed using the client device to facilitate selection of at least one of the visually suggested network content fragments to be visually merged with the network content being browsed, wherein said visually suggest is based at least in part on an association at a server of the network content fragments with the network content being browsed,
receive the selection to merge the at least one of the visually suggested network content fragments with the network content being browsed, and
in response to the received selection, facilitate a merger of the selected at least one of the network content fragments with the network content being browsed as merged content presented on the display of the client device, wherein said facilitate the merger includes combine a specification/structural description of the selected at least one of the network content fragments with a specification/structural description of the network content being browsed to produce a combined specification/structural description, the combined specification/structural description specifying the merged content.

26. The apparatus of claim 25, wherein the client device further includes a browser with a browser plug-in to perform said visually suggest, said receive, and said facilitate.

27. The apparatus of claim 25,
wherein to said combine, the client logic is further configured to:
compare values of the specification/structural description of the selected at least one of the network content fragments with values of the specification/structural description of the network content being browsed to determine similarities; and
add the specification/structural description of the selected at least one of the network content fragments to the specification/structural description of the network content being browsed, at one or more locations within the specification/structural description of the network content being browsed where similarities are determined to exist.

* * * * *